United States Patent
Oakeson et al.

(10) Patent No.: US 7,269,731 B2
(45) Date of Patent: Sep. 11, 2007

(54) MESSAGE AUTHORIZATION SYSTEM AND METHOD

(75) Inventors: Kenneth L. Oakeson, Boise, ID (US); Shell S. Simpson, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1035 days.

(21) Appl. No.: 10/353,579

(22) Filed: Jan. 29, 2003

(65) Prior Publication Data

US 2004/0145773 A1    Jul. 29, 2004

(51) Int. Cl.
*G06F 1/24*    (2006.01)
(52) U.S. Cl. .................. 713/172; 713/159; 713/193; 713/161
(58) Field of Classification Search ............... 713/172, 713/159, 193, 161
See application file for complete search history.

(56) References Cited

U.S. PATENT DOCUMENTS

| | | | | |
|---|---|---|---|---|
| 5,291,555 A | * | 3/1994 | Cuomo et al. | 380/263 |
| 5,377,269 A | * | 12/1994 | Heptig et al. | 726/20 |
| 5,432,697 A | * | 7/1995 | Hayes | 700/38 |
| 6,362,893 B1 | | 3/2002 | Francis et al. | |

* cited by examiner

*Primary Examiner*—Thomas R. Peeso

(57) ABSTRACT

A system and method for authorizing electronic messages is provided. One embodiment of the system includes message receiving logic that determines whether a received message comes from an authorized sender based on a pre-assigned token. In another embodiment, a message transmission logic configures a message with a pre-assigned token for transmission to a destination address. The present system and method allows for improved control of electronic messages.

33 Claims, 4 Drawing Sheets

MESSAGE AUTHORIZATION SYSTEM AND METHOD

BACKGROUND

Computers, personal digital assistants, and imaging devices such as printers may be capable of accepting e-mail messages from an external network such as the Internet. The e-mail messages, including any attachments, are typically accepted and sometimes automatically printed by a receiving device. Accepting unwanted or other spam-type messages and printing them consumes the resources of the printer. One way to reduce such messages is to filter incoming e-mails based on known addresses that send spam, by guessing keywords that may appear in the subject or body of the message, or other filter. These types of filtering techniques can still accept many unwanted messages since addresses and keywords are easily changed by a sender.

A new and useful method and system for authorizing messages is provided.

SUMMARY

In accordance with one embodiment, a system for authorizing messages received by a destination device is provided. The system comprises message verification logic configured to determine if a received message includes a token. A validity logic is configured to determine if the token matches a valid token from a set of valid tokens pre-assigned to one or more sender devices. If the token fails to match a valid token, logic is configured to process the received message as an unauthorized message.

BRIEF DESCRIPTION OF THE DRAWINGS

In the accompanying drawings which are incorporated in and constitute a part of the specification, embodiments of a system and method are illustrated, which together with the detailed description given below, serve to describe the example embodiments of the system and method. It will be appreciated that the illustrated boundaries of elements (e.g. boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vise versa.

DETAILED DESCRIPTION OF ILLUSTRATED EMBODIMENTS

Figure 1:
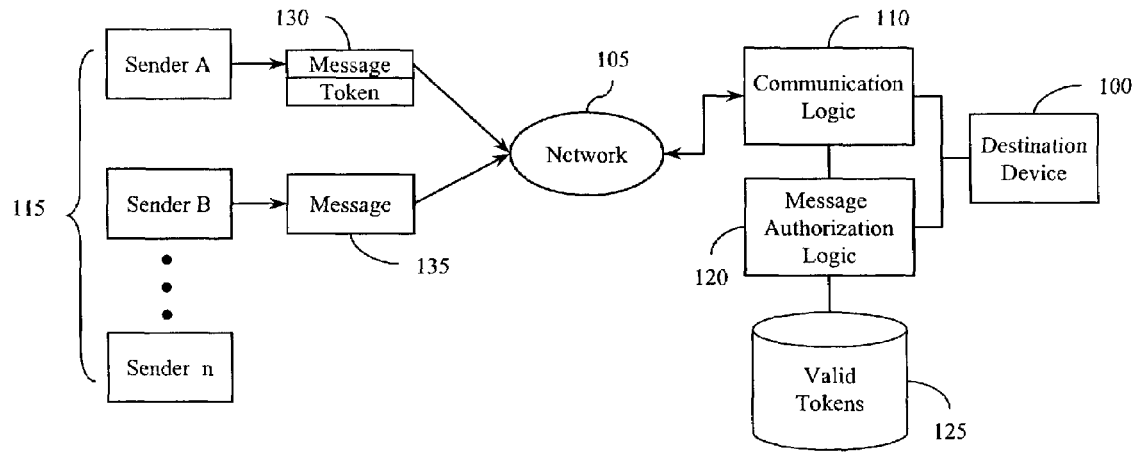
FIG. 1 is an example system diagram of one embodiment of a device that received messages from one or more senders.

The following includes definitions of selected terms used throughout the disclosure. Both singular and plural forms of all terms fall within each meaning:

"Computer-readable medium" as used herein refers to any medium that participates in directly or indirectly providing signals, instructions and/or data to one or more processors for execution. Such a medium may take many forms, including but not limited to, non-volatile media, volatile media, and transmission media. Non-volatile media may include, for example, optical or magnetic disks. Volatile media may include dynamic memory. Transmission media may include coaxial cables, copper wire, and fiber optic cables. Transmission media can also take the form of acoustic or light waves, such as those generated during radio-wave and infra-red data communications, or be formed as one or more groups of signals. Common forms of computer-readable media include, for example, a floppy disk, a flexible disk, hard disk, magnetic tape, or any other magnetic medium, a CD-ROM, any other optical medium, punch cards, papertape, any other physical medium with patterns of holes, a RAM, a PROM, an EPROM, a FLASH-EPROM, any other memory chip or cartridge, a carrier wave/pulse, or any other medium from which a computer, processor or other electronic device can read.

"Logic", as used herein, includes but is not limited to hardware, firmware, software and/or combinations of each to perform a function(s) or an action(s), and/or to cause a function or action from another component. For example, based on a desired application or needs, logic may include a software controlled microprocessor, discrete logic such as an application specific integrated circuit (ASIC), a programmed logic device, memory device containing instructions, or the like. Logic may also be fully embodied as software.

"Signal", as used herein, includes but is not limited to one or more electrical signals, analog or digital signals, one or more computer or processor instructions, messages, a bit or bit stream, or other means that can be received, transmitted, and/or detected.

"Software", as used herein, includes but is not limited to one or more computer readable and/or executable instructions that cause a computer or other electronic device to perform functions, actions, and/or behave in a desired manner. The instructions may be embodied in various forms such as routines, algorithms, modules or programs including separate applications or code from dynamically linked libraries. Software may also be implemented in various forms such as a stand-alone program, a function call, a servlet, an applet, instructions stored in a memory, part of an operating system or other type of executable instructions. It will be appreciated by one of ordinary skill in the art that the form of software is dependent on, for example, requirements of a desired application, the environment it runs on, and/or the desires of a designer/programmer or the like.

"User", as used herein, includes but is not limited to one or more persons, software, computers or other devices, or combinations of these.

Briefly describing one embodiment of the present system and method, it provides a mechanism to reduce unwanted or unauthorized e-mail messages (sometimes referred to as spam) received by an imaging device, computer, or other electronic device. For example, the system can assign tokens to authorized senders where the token would be included in any e-mails sent from the sender to the system. The system can verify whether the sender is a pre-authorized source of messages based on the token in the e-mail. E-mail messages that do not include a valid token are treated as unauthorized and can be blocked, disregarded and/or processed in another manner. Tokens can be revoked or re-assigned to a sender. Different tokens can be assigned to different senders, either to individuals or to groups such as an organization. By blocking unauthorized e-mails, an the system can preserve resources, for example, by not printing these types of messages. With this messaging mechanism, a device can better control acceptance of e-mail messages.

Illustrated in FIG. 1 is one embodiment of a message authorization system for a destination device 100 that is capable of receiving electronic messages from a network 105. It will be appreciated that the destination device 100 may include one or more types of devices and/or configurations such as an imaging device communicating with the network 105, a computer, server, or network of computers that communicate with the network 105 and process messages to one or more imaging devices for printing. For purposes of the following discussion, a configuration of a computer connected to a printer will be used as the destination device 100. It will be appreciated that the components of the system may be embodied within the computer, the printer, a separate client, or combinations of these.

The destination device 100 includes communication logic 110 to communicate with the network 105. The communication logic 110 includes network interface hardware and software to communicate with, for example, the Internet. To receive messages, such as e-mail messages from the network 105, the destination device 100 has an assigned network address to which other devices connected to the network 105 may transmit messages. For example, sending devices 115 are illustrated. Messages received by the destination device 100 are screened by a message authorization logic 120 which determines if a received message comes from an authorized sender or not.

In one embodiment, the determination is made based on one or more valid tokens 125 that have been assigned to previously authorized senders, for example, a previously authorized e-mail address. In order for a received message to be accepted by the destination device 100, the received message would have to include a valid token. Accordingly, a sender would be aware of this protocol and include or otherwise attach a valid token to any message sent to this particular destination device 100.

For example, if sender A has been authorized by the destination device 100 to transmit messages to it, the destination device 100 would assign an authorization token to sender A. For example, a message 130 transmitted by sender A to the destination device 100 includes a preassigned token associated with the destination device 100. Presume sender B has not been authorized by the destination device 100 and thus, message 135 transmitted by sender B does not include a token. When the messages are received by the destination device 100, the message authorization logic 120 determines whether each message includes a token and whether the token is valid. Message 130 includes a valid token and is accepted by the destination device 100 and may be printed. Message 135 is presumed to come from an unauthorized or unwanted sender and thus would not be printed and may be alternatively processed such as by being deleted, stored in a separate folder, or treated in another desired manner. With this authorization system, a device can associate tokens to trusted senders and prevent acceptance of unwanted messages from untrusted senders.

Figure 2:
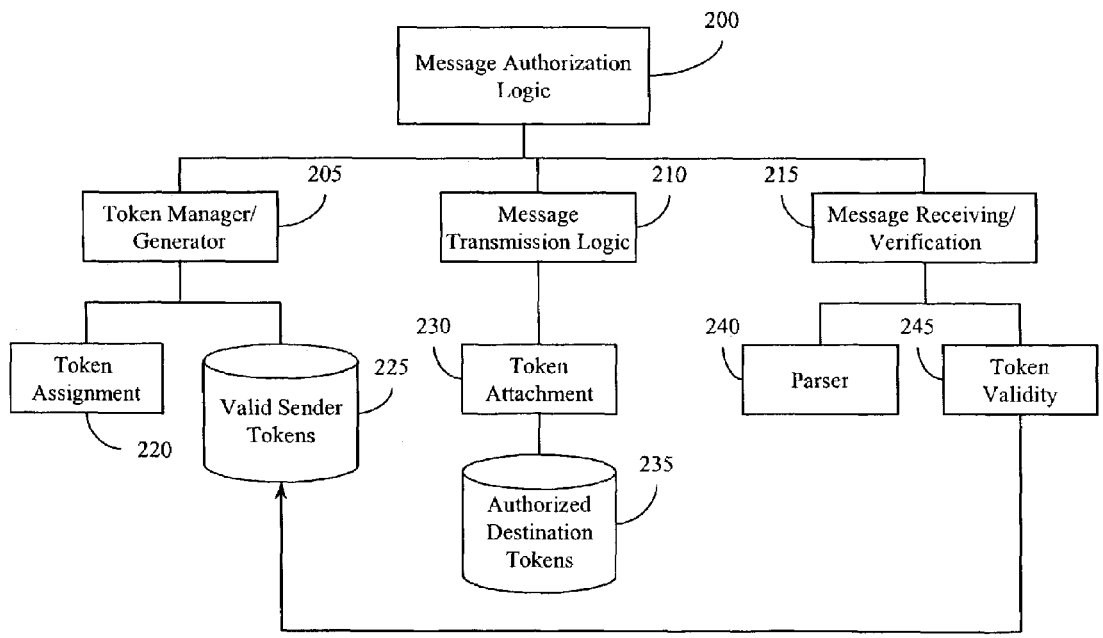
FIG. 2 is an example of a component diagram of one embodiment of a message authorization system.

With reference to FIG. 2, one embodiment of a message authorization logic 200 is shown with three optional components including a token manager/generator 205, message transmission logic 210, and message receiving/verification 215. The token generator 205 is configured to generate and assign tokens to a sending device that wishes to be an authorized sender of messages. The message transmission logic 210 is configured to process out-going messages by attaching an appropriate token to a message based on its destination address. The message receiving/verification component 215 is configured to process in-coming messages and determine if they are valid. It will be appreciated that these components may be part of the same software on a processing device, may be part of separate software components, or may be embodied on separate processing devices. For example, the message transmission logic 210 may be part of a server that has network communication responsibilities while components 205 and 215 may be part of another computer in communication with the server.

Before a message can include a valid token, a token needs to be generated and assigned to a particular sender. In one embodiment of the token manager/generator 205, it is configured to perform this task by generating and assigning tokens. Various types of number and/or character generator software may be used as well as logic configured to generate various types of tokens. For example, a random number generator can generate random unique tokens, sufficiently unique tokens, and/or combinations of numbers and characters of various lengths. The token generator 205 may include a sequential counter, an algorithm that generates known sequences or combinations of these. It will be appreciated that a token may include any type or amount of characters and/or numbers. A token may also be a word or phrase.

Tokens may be assigned to a sender in a variety of ways. For example, a sender may request a token from the destination device through a token assignment logic 220. In one embodiment, this may be a web-based interface provided for a destination device that a sender may access. From the interface, the sender may request to be an authorized sender and can receive a valid token if approved. If the sender is approved, a token would be generated and assigned to the sender. On the destination device side, the assigned token would be stored in a set of valid tokens 225 which would be used for verifying in-coming messages in the future. The valid tokens 225 may be maintained in one or more databases, tables, text files, arrays, linked lists, address books, contact lists or other desired data structure and stored in a computer-readable medium. The tokens may be stored individually, may be stored with an associated sender's address, or both.

Tokens may be assigned in a variety of ways which may be included as options in the system. For example, the system may include logic that allows a user to select people from a contacts list that will be authorized senders of electronic messages. For each selected sender, the token assignment logic 220 can generate an authorization token for their corresponding e-mail address, store the association of token and address in the valid tokens data structure 225, and transmit a notification to each of the addresses of their authorization token. The authorization token would then be used for communicating messages to this device. On the sender's device, when a notification of token assignment is received, the messaging system may automatically update and store the authorized token for the address from which it was received. This may also be done manually.

Another option of assigning a token to a sender may include allowing the sender to telephone or otherwise contact a user of a destination device 100 and request an authorization token. A token can then be generated for the sender and given to them for use in e-mail transmissions to the destination device.

With further reference to FIG. 2, the message transmission logic 210 is responsible for configuring out-going messages to include a proper authorization token, if available, for each destination address. For example, when an electronic message is generated, forwarded, or otherwise transmitted from the device to one or more destination devices/addresses, a token attachment logic 230 is configured to determine whether an authorized token exists for each of the destination devices and attaches a token to the message being sent to its corresponding destination address.

In that regard, a data structure of assigned destination tokens 235 may be maintained that contains pre-authorized tokens and their associated destination address which have been previously assigned to this device. In another embodiment, authorized tokens may be maintained as part of each contact within, for example, an electronic address book. As mentioned previously, an authorized token for a destination device would be previously received from the destination device which requires the token to be attached to any messages sent to it. It will be appreciated that the sender tokens 225 and the destination tokens 235 may be maintained in similar data structures, maintained together, and/or maintain separately.

Consider the following example. Sender A has an address of senderA@networkA.com and wishes to send an e-mail message to destination_1@network1.com and destination_2@network2.com. Before the message is transmitted to the network, the token attachment logic 230 would determine if authorization tokens exist for the destination addresses by reading from the authorized destination tokens 235, reading from the address book entries corresponding to these addresses, and/or reading from another area that has been configured to store authorized tokens. The determination may find that destination 1 has assigned sender A the token of "K57M31" and a destination 2 has assigned the token of "ZG8427V".

Each identified token is then attached to the message transmitted to its corresponding destination address. The token may be attached, for example, by inserting it in the e-mail header, the subject line, the body of the text, attached as a file or object, and/or attached or associated with the message according to a predetermined protocol. The token may also be included as a MIME component of the e-mail body, may be referenced as a link, or associated with the e-mail message in other ways.

With reference again to FIG. 2, the message receiving/verification logic 215 is configured to screen in-coming messages and determine whether they are from an authorized sender or not. When an electronic message is received, a parser 240 or other type of scanning logic parses through the components of the message and tries to identify an attached token. If, however, a specific protocol has been designated for the attachment of tokens, the parser 240 would read the token information based on the protocol. If a token is found, a token validity logic 245 compares the found token with the set of valid sender tokens 225. If the found token is valid, the message is processed as an authorized message.

Different levels of authorization and token validity may be implemented. For example, one level of validity may include simply matching a received token with any valid token 225. Another level may be that the received token and its corresponding sender's address must match a valid token 225 which is associated with that sender's address. Thus, both the token and sender's address must match.

If a token is not found in a received e-mail message or is found but is determined to be invalid, the message is treated as an unauthorized message from an unauthorized sender. The message may be processed in a variety of ways. For example, the message may be deleted, moved to a special folder, placed in a queue that requires specific acceptance, or other ways as desired.

Tokens may be managed and used in other ways. In one embodiment, public-private key encryption can be used in conjunction with tokens. Logic can be configured to encrypt a token with a sender's public key so that only an intended e-mail sender could use the token. A sender's messaging logic could encrypt a token with a destination device's public key so that the token could not be intercepted or at least more difficult to intercept. To prevent reply attacks, a sender's messaging logic could retrieve new keys from a destination device for every e-mail or apply a predetermined algorithm to a previous token or group of tokens from the destination which would generate a new token based on the previous token. It will be appreciated that tokens can be generated, transmitted, and/or managed by either the destination device such as an imaging device, a proxy for the imaging device such as a computer, and/or a separate client for a destination device.

In another embodiment, the message authorization logic 200 includes logic to dynamically change the valid sender tokens 225 assigned to sender addresses. For example, a new token may be periodically generated at predetermined time intervals so that any particular token is valid for the predetermined interval. New tokens may be generated every minute, every five minutes, daily, monthly or any desired interval. A new token can be generated at the occurrence of an event such as receiving a message from a sender. As mentioned previously, various types of number and/or character generator software may be used as well as logic configured to generate various types of tokens. For example, a random number generator can generate random unique tokens, sufficiently unique to codes, and/or combinations of numbers and characters. The number generator may also be a sequential counter, an algorithm that generates known sequences or combinations of these. Tokens may also be words or phrases. It will be appreciated that an access code may include any type or amount of numbers, characters or both. In this manner, the authorization logic 200 can reduce or prevent unauthorized e-mail received from external networks by identifying valid senders from the token included in the message.

Figure 3:
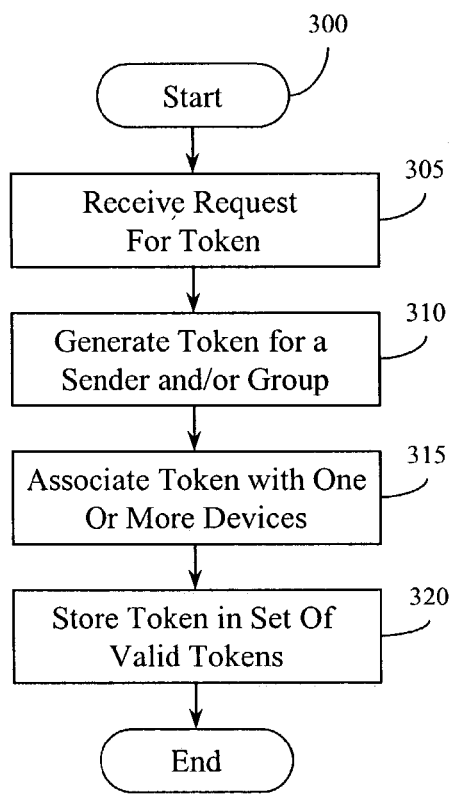
FIG. 3 is an example methodology of generating tokens.

Illustrated in FIG. 3 is one embodiment of a methodology 300 associated with assigning tokens to senders. The illustrated elements denote "processing blocks" and represent software instructions or groups of instructions that cause one or more computers or processors to perform an action(s) and/or to make decisions. Alternatively, the processing blocks may represent functions and/or actions performed by functionally equivalent circuits such as a digital signal processor circuit, an application specific integrated circuit (ASIC), other logic device or firmware. The diagram, as well as the other illustrated diagrams, do not depict syntax of any particular programming language. Rather, the diagram illustrates functional information one skilled in the art could use to fabricate circuits, generate computer software, or use a combination of hardware and software to perform the illustrated processing. It will be appreciated that electronic and software applications may involve dynamic and flexible processes such that the illustrated blocks can be performed in other sequences different than the one shown and/or blocks may be combined or separated into multiple components. They may also be implemented using various programming approaches such as machine language, procedural, object oriented and/or artificial intelligence techniques. The foregoing applies to all figures described herein.

With reference to FIG. 3, one embodiment of a process for generating and assigning a token is shown. The process is initiated when a request for a token is received (Block 305). As discussed previously, a first device can designate one or more authorized senders from which the first device will accept e-mail messages. The first device (the e-mail recipient) can verify whether a received e-mail is authorized if it includes an authorized token assigned by the first device. Thus, a token is generated for a sender or group of senders or organization that have been authorized to send electronic messages (Block 310). The generated token is then assigned or otherwise associated with the sending device (Block 315). This may include assigning a token to a specific sender address or assigning a common token to a group of addresses. After the token is generated, it is transmitted to the sending device. The token can then stored in a set of valid tokens (Block 320) maintained by and/or for the recipient device. Thereafter, when a sending device transmits an electronic message to the recipient device, the previously assigned token would be included with the electronic message. The recipient device can then verify that a received message comes from an authorized sender based on the token.

Figure 4:
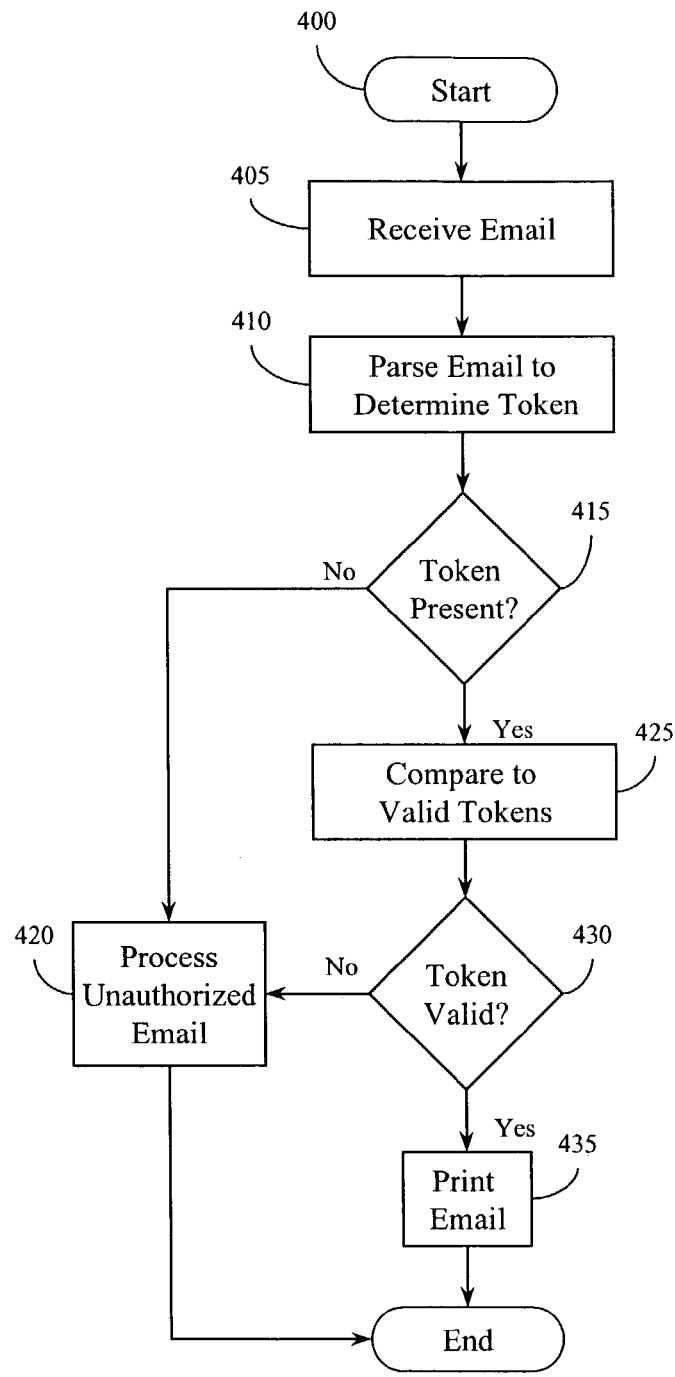
FIG. 4 is an example methodology of determining if a received message is authorized.

With reference to FIG. 4, one embodiment of a methodology 400 for authenticating a received e-mail message is shown. In the following example, a receiving device is configured to automatically print accepted e-mail messages which is an optional configuration. In this configuration, it is not desired to automatically print unauthorized messages. After an e-mail message is received (Block 405), the message is parsed to determine whether a token is present (Block 410). This may include scanning the contents of the message and any attachments to identify a recognized token, or searching a pre-designated area of the message according to a predetermined protocol. For example, a protocol may require that a token be embedded within the header of a message. If a token is not present or unable to be identified (Block 415), the message is processed as an unauthorized e-mail (Block 420). This may include discarding the message, placing the message in an alternative location such as a client's temporary bulk mail folder, and/or pausing the printing operation until separate approval of the message is received.

If a token is present (Block 415), the token is compared to a set of valid tokens (Block 425). If the received token is valid (Block 430), the e-mail message is then printed (Block 435). In one embodiment, a received token is valid if it matches one of the previously assigned valid tokens, or if an additional level of security is used, a token is valid if it matches both a valid token which is associated to a particular sender's address.

Figure 5:
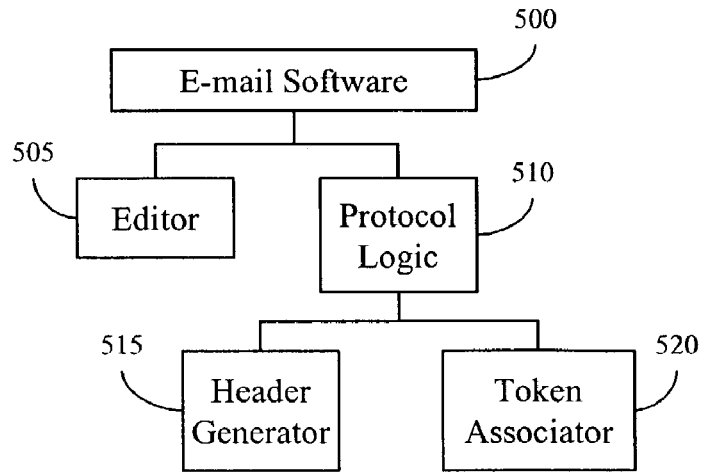
FIG. 5 is one embodiment of an e-mail software system that can associate tokens to a message.

Illustrated in FIG. 5 is one embodiment of e-mail messaging software 500 including components to generate a message and associate a token thereto. Of course, other components may be included within the e-mail software 500 to perform other desired options and features. In one embodiment, an editor 505 includes editing logic configured to generate messages. The logic allows a user to create and compose a message with, for example, a subject line, text, graphics, attach files or objects, and identify one or more destination addresses. In another embodiment, the editor 505 may be configured to programmatically generate messages from a template and transmit the messages to one or more destinations. For example, messages such as those that contain notices, billing information, announcements or other types of information, can be generated for each person on a customer list. The editor 505 can be configured to generate a message that includes pre-defined text from a template. Each message can be programmatically customized from information known about the customer such as name, account number, e-mail address, service history, or other data that can be maintained for a customer. Customer data may be read from one or more data structures. Also, if an authorization token has been assigned from a customer, the token would be attached to the message. The editor 505 may include one or both of the above embodiments and/or be configured with other desired message generation capabilities.

A protocol logic 510 configures the message to be transmitted over a network according to a network communication protocol such as TCP/IP, SMTP, X.400, or other variations or combinations of these. The network protocol is a set of conventions defining the syntax and sequencing of messages sent over the network. Two protocols that may be used for implementing client/server mail on the Internet include SMTP and POP3. Several refinements exist for these protocols. For example, PEM and S/MIME support encrypted attachments, and S/SMTP provides encrypted server-to-server transmission.

When configuring a message, a header generator 515 may generate header information for the message, for example in accordance with RFC 2822. A token associator 520 is configured to identify if authorization tokens exist for each of the destination addresses. If a token is available for a destination address, the token is attached to the copy of the message directed to that destination. Another embodiment of a token associator 520 is described as the message transmission logic 210. It will be appreciated that the e-mail software 500 may include some or all of the message authorization logic 200 shown in FIG. 2.

In general, e-mail software 500 can be embodied as a proprietary email system such as Microsoft Mail, Microsoft Exchange Server, cc:Mail, and DaVinci Mail. The e-mail software 500 may also be a custom developed software application. Most designs share a common file area on a server disk and put all the intelligence in client software. This is called a passive-server design. By comparison, true client/server designs, such as SMTP mail and the European X.400, have an active-server software component, called a Message Transfer Agent (MTA). The MTA accepts network protocol requests from the client software, which is called a User Agent. The client software can access the shared file area, the Message Store, via requests to the server; therefore, the shared file area is not exposed. The e-mail software 500 may be implemented based on any of these configurations.

Figure 6:
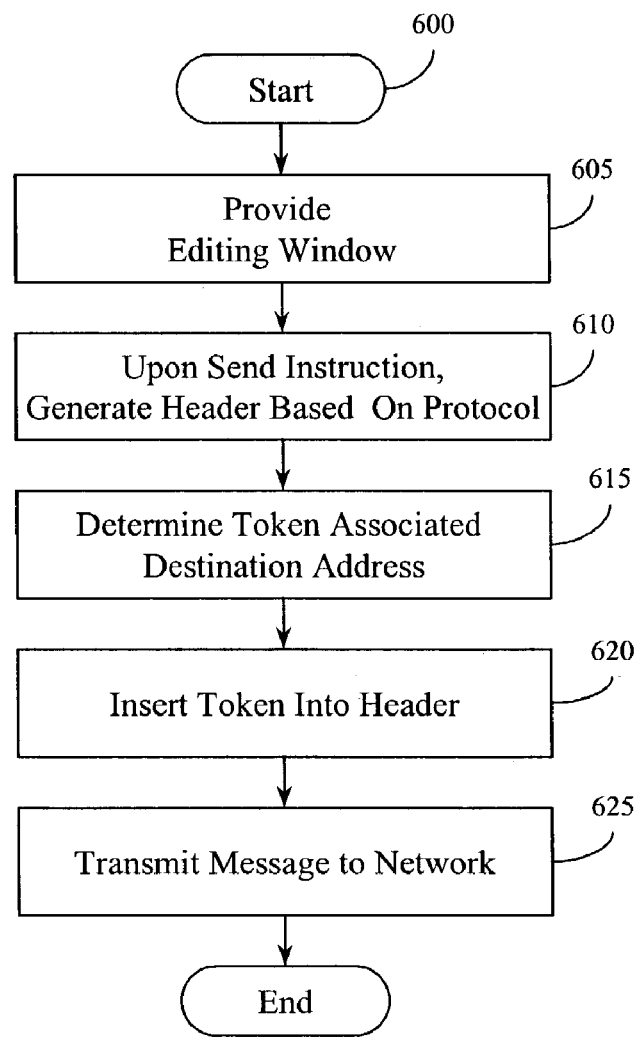
FIG. 6 is an example methodology of creating a message and attaching a token.

With reference to FIG. 6, one embodiment of a methodology 600 is shown for creating and transmitting an electronic message with an authorized token. After a request to create or compose an electronic message is received, an editing window is provided which allows a user to create the contents of the message (Block 605). This also includes providing a mechanism that allows identification of one or more destination addresses to which the message is to be transmitted. Once the message is complete and a send instruction or other equivalent is given, a header is generated for the message based on the communication protocol being used (Block 610). Of course, the header and other components of the message may be generated at other times during the process. For each destination address, it is determined whether an authorization token has been assigned for that destination address, and if so, the token is attached to the message (Block 620). A copy of the message is then transmitted to each identified destination address over a network (Block 625). If a particular destination address requires an authorization token and the token is still valid, the message should be accepted by the destination, otherwise the message may be rejected by the destination address.

Figure 7:
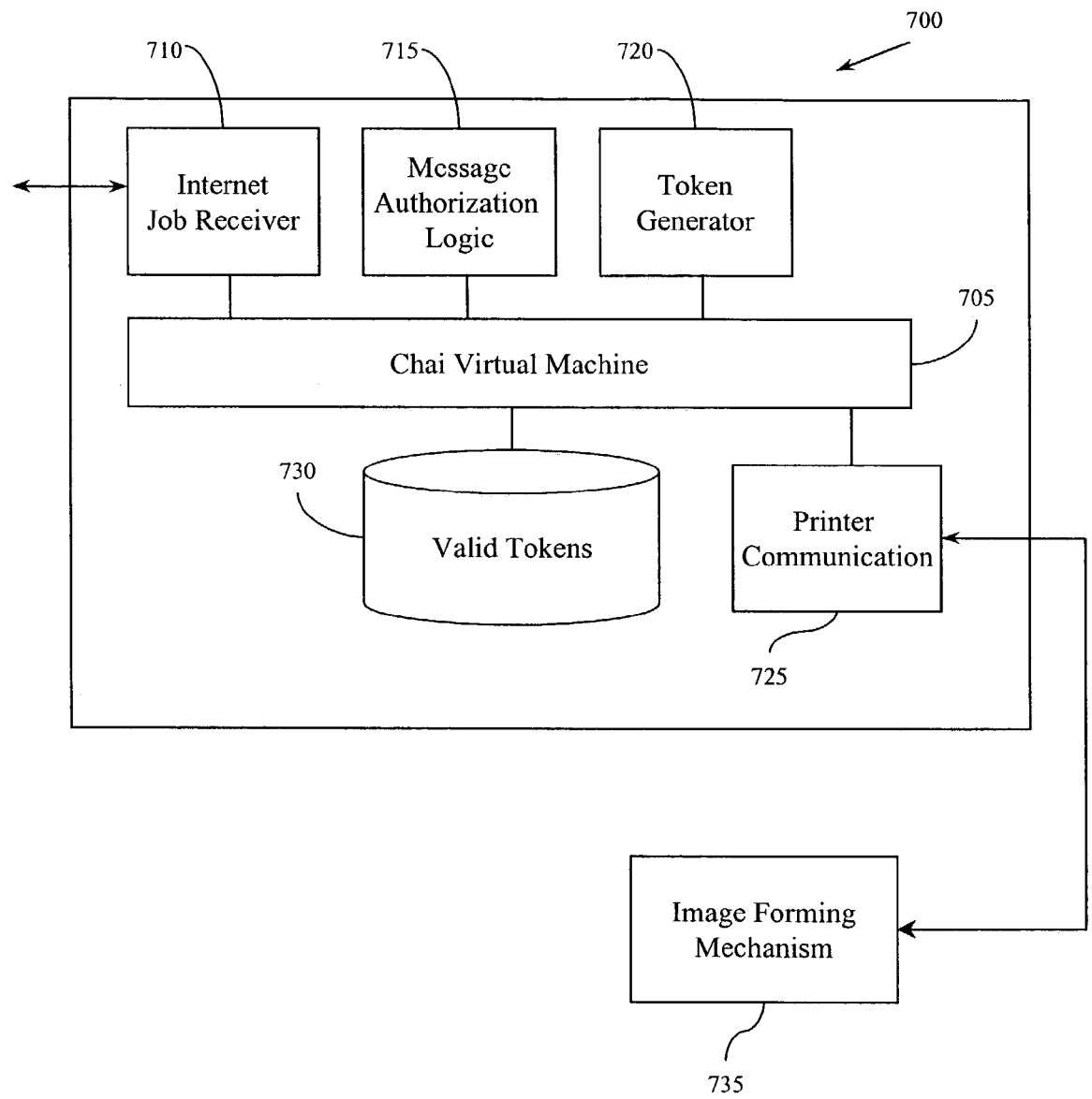
FIG. 7 is another embodiment of a message authorization system embedding within an imaging device.

Illustrated in FIG. 7 is another embodiment of a message authorization system 700 that is embodied within an imaging device. In this embodiment, the imaging device includes logic capable of executing instructions in order to perform the authorization mechanism. For example, a Chai virtual machine 705 or other logic is included that executes Java code instructions. Code running on the virtual machine 705 controls other components such as Internet communication 710, a message authorization logic 715, a token generator 720, and printer communication 725. The imaging device may also include memory, storage or both to maintain one or more valid tokens 730 assigned to authorized senders. One or more tokens that have been assigned to the imaging device from recipient devices may also be stored. These tokens would be used when the imaging device sends messages, if that feature is provided.

The imaging device would have a valid network address such that it can be accessed through a remote network such as the Internet. When a message is received from a remote network, the authorization logic 715 determines if the message includes a token that matches one of the stored tokens 730. If there is a match, the message is valid and is sent to an image forming mechanism 735 of the imaging device to print the message. The image forming mechanism 735 will vary based on the type of imaging device and may include a laser imaging mechanism, other toner-based imaging mechanisms, an ink jet mechanism, digital imaging mechanism, or other imaging reproduction engine.

With this embodiment, an imaging device may be independently controlled and may maintain its own message authorization system or, it may rely on a master imaging device with an authorization system. A print server may be used with this type of imaging device and it will be appreciated that variations of embodiments shown in FIGS. 1, 2 and 7 may be implemented with different functionalities and components being divided between the server and the imaging device.

The various components of the present system and method can be implemented using suitable software, programming languages, and tools such as Java, C#, C++, C, CGI, Perl, SQL, APIs, SDKs, assembly, firmware, microcode, and/or other languages and/or tools. The components embodied as software include computer readable/executable instructions that cause a computer or processor to behave in a prescribed manner. Any software, whether an entire system or a component of a system, may be embodied as an article of manufacture and/or stored in a computer-readable medium as defined previously. It will be appreciated that components described herein may be implemented as separate components or may be combined together.

While the present invention has been illustrated by the description of embodiments thereof, and while the embodiments have been described in considerable detail, it is not the intention of the applicants to restrict or in any way limit the scope of the amended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

We claim:

1. A system for authorizing messages received by a destination device, the system comprising:
    message verification logic configured to determine if a received message includes a token;
    validity logic configured to determine if the token matches a valid token from a set of valid tokens pre-assigned to one or more sender devices; and
    logic configured to process the received message as an unauthorized message if the token fails to match a valid token.

2. The system of claim 1 further including a computer-readable medium configured to maintain the set of valid tokens.

3. The system of claim 2 wherein each token from the set of valid tokens includes an association to one or more assigned sender devices.

4. The system of claim 1 further including a token generator logic configured to generate tokens, and configured to assign a token to one or more sender devices.

5. The system of claim 4 wherein the token generator logic includes a random number generator.

6. The system of claim 1 wherein the system is embodied in an imaging device.

7. The system of claim 1 wherein the system is embodied in a server.

8. The system of claim 1 further including logic for encrypting and decrypting tokens.

9. An electronic messaging system comprising:
    editing logic configured to generate and edit an electronic message including allowing for identification of a destination address; and
    token association logic configured to associate a pre-authorized token to the electronic message based on the destination address, where the pre-authorized token has been assigned by the destination address in order to accept electronic messages from a sending device.

10. The system of claim 9 wherein the electronic messaging system is embodied as an article of manufacture embodied in a computer-readable medium and the editing logic and the token association logic are embodied as processor executable instructions stored thereon.

11. The system of claim 9 wherein the token association logic is configured to include the pre-authorized token in a header of the electronic message.

12. The system of claim 9 wherein the token association logic is configured to attach the pre-authorized token to the electronic message.

13. The system of claim 9 further including a computer-readable medium configured to store one or more destination addresses and a pre-authorized token assigned from the one or more destination addresses.

14. The system of claim 9 further including protocol logic for configuring the electronic message into a transmittable form based on a selected communication protocol.

15. The system of claim 9 wherein the token association logic is configured to encrypt the pre-authorized token.

16. The system of claim 9 wherein the system is embodied as software.

17. The system of claim 9 wherein the editing logic is configured to programmatically generate one or more electronic messages.

18. A method of processing electronic messages received from a network, the method comprising the steps of:

analyzing a message received from a sending device to identify an authorization token;

comparing the authorization token to one or more valid tokens previously associated with one or more authorized sending devices; and accepting the electronic message as an authorized message if the authorization token matches a token associated with the sending device, otherwise processing the electronic message as an unauthorized message.

19. The method as set forth in claim 18 further including assigning an authorization token to a sending device prior to accepting electronic messages from the sending device.

20. The method as set forth in claim 18 further including re-assigning an authorization token to a sending device.

21. The method as set forth in claim 18 further including storing the one or more valid tokens with associated sending devices.

22. An article of manufacture embodied in a computer-readable medium for use in a processing system for processing electronic messages to and/or from a network, the article comprising:

a token manager logic for causing a processing system to generate and associate an authorization token to a device that transmits electronic messages to the processing system, where the authorization token identifies the device as a pre-authorized source;

message receiving logic for causing a processing system to verify whether a received electronic message came from a pre-authorized source; and message transmitting logic for causing a processing system to associate an authorization token to an electronic message that is to be transmitted to one or more destinations over the network.

23. The article as set forth in claim 22 wherein the token manager logic includes a token generator that causes a processing system to generate one or more tokens upon a request.

24. The article as set forth in claim 23 wherein the token generator includes logic configured to dynamically change the authorization token to the device such that the authorization token is valid for a predetermined time interval.

25. The article as set forth in claim 22 wherein the message receiving logic includes a parser causing a processing system to search for a token in a received electronic message.

26. The article as set forth in claim 22 wherein message transmitting logic includes means from causing a processing system to associate a token to an electronic message.

27. The article as set forth in claim 22 further including means for generating electronic messages.

28. An image forming device comprising:

logic for communicating to a network;

message authorization logic configured to determine if an electronic message received from the network comes from an authorized source based on an authorization token associated to the electronic message; and an image forming mechanism for imaging the electronic message received from the network if the electronic message includes a valid authorization token.

29. The image forming device of claim 28 further including authorization token generator for generating one or more authorization tokens to be associated with electronic messages.

30. The image forming device of claim 29 wherein the authorization token generator is configured to periodically generate authorization tokens at predetermined time intervals so that any authorization token is valid for a predetermined interval.

31. The image forming device of claim 29 wherein the authorization token generator is configured to generate unique tokens.

32. The image forming device of claim 28 wherein image forming mechanism includes a laser imaging mechanism.

33. The image forming device of claim 32 wherein image forming mechanism includes an ink jet imaging mechanism.

* * * * *

UNITED STATES PATENT AND TRADEMARK OFFICE
CERTIFICATE OF CORRECTION

| | |
|---|---|
| PATENT NO. | : 7,269,731 B2 |
| APPLICATION NO. | : 10/353579 |
| DATED | : September 11, 2007 |
| INVENTOR(S) | : Kenneth L. Oakeson et al. |

Page 1 of 1

It is certified that error appears in the above-identified patent and that said Letters Patent is hereby corrected as shown below:

In column 9, line 62, delete "amended" and insert -- appended --, therefor.

Signed and Sealed this

Twenty-fourth Day of June, 2008

JON W. DUDAS
*Director of the United States Patent and Trademark Office*